United States Patent [19]
Hatta et al.

[11] Patent Number: 4,465,647
[45] Date of Patent: Aug. 14, 1984

[54] METHOD OF MAKING FLAKY β-SIC

[75] Inventors: Tokuaki Hatta; Haruyuki Ueno; Yuji Katsura; Kazushige Fukuda; Hiroshi Kubota; Takashi Hamamatu, all of Kitakyushu, Japan

[73] Assignee: Kurosaki Refractories Co., Ltd., Fukuoka, Japan

[21] Appl. No.: 343,081

[22] Filed: Jan. 27, 1982

Related U.S. Application Data

[62] Division of Ser. No. 230,179, Jan. 30, 1981, Pat. No. 4,387,080.

[30] Foreign Application Priority Data

Jan. 31, 1980 [JP] Japan .................................. 55-11281

[51] Int. Cl.$^3$ ............................................. C04B 35/56
[52] U.S. Cl. ..................................... 264/29.6; 264/65; 264/67; 264/138; 264/140; 501/88
[58] Field of Search .................. 264/29.6, 67, 138, 65, 264/140; 501/88, 90; 423/345

[56] References Cited

U.S. PATENT DOCUMENTS

| | | | |
|---|---|---|---|
| 3,661,662 | 5/1972 | Allen | 428/404 |
| 3,853,567 | 12/1974 | Verbeek | 501/90 |
| 4,117,057 | 9/1978 | Yajima et al. | 264/65 |
| 4,283,376 | 8/1981 | Yajima et al. | 264/65 |
| 4,374,793 | 2/1983 | Koga et al. | 264/65 |

*Primary Examiner*—Helen M. McCarthy
*Attorney, Agent, or Firm*—Jordan and Hamburg

[57] ABSTRACT

Flaky β-SiC mainly composed of β-SiC which is obtained from an organic silicon polymer containing the carbon and silicon atoms as the major skeletal component and the method for producing such flaky β-SiC are disclosed. Such β-SiC is especially utilized as the starting material for ceramics having a laminar structure as well as for the refractories. The ceramics and refractories provided with such β-SiC have excellent resistance to thermal shock, to thermal fatigue as well as to oxidation.

3 Claims, No Drawings

METHOD OF MAKING FLAKY β-SIC

This is a division of application Ser. No. 230,179, filed Jan. 30, 1981, now U.S. Pat. No. 4,387,080.

DETAILED DESCRIPTION OF THE DISCLOSURE INCLUDING BACKGROUND OF INVENTION

The present invention relates to new ceramics and their preparation method. More particularly, it relates to novel ceramics made of flaky β-SiC containing β-SiC as the major component; a process for preparation of such materials; and their applications. The objects of the present invention are to provide new ceramics with improved properties in resistance to thermal shock, thermal fatigue and oxidation which are prepared from an organic silicon polymer compound (to be explained later in detail) as the starting material; and to manufacture novel ceramics and refractories with desirable physico-chemical properties by utilizing the above ceramics as the starting material.

Flaky β-SiC of the present invention (or to be described as thin fragments or scales) is a hitherto unknown type of ceramics and is obtained by following method in which thin sheet is prepared with an organic silicon polymer compound containing the carbon and silicon atoms as the major skeletal components, the sheet is made infusible by conventional methods; the infusible sheet is cut into flakes and finally the flakes are heat-treated in the atmosphere of a non-oxidative gas. This material finds utility in the starting material for new sintered ceramic compact and refractories having a unidirectional or random laminary structure. The organic silicon polymer employed in the present invention is a high-molecular organic silicon compound containing the silicon and carbon atoms as the major skeletal components which has been synthesized by Prof. Yajima et al., the Research Institute for Iron, Steel and Other Metals, Tohoku University. It is well known that SiC fibers derived from such organic silicon polymers have also become well known world-wide by many papers and patents filed by Prof. Yajima et al.

The organic silicon polymer has opened a new field of research in materials and is utilized as the starting material for fibers as well as for binders, impregnants and coating compounds.

The present inventors have succeeded in preparation of a new sheet or flaky β-SiC from the organic silicon polymer and one of the major objects of the present invention is to provide special thermo-resistant ceramics having excellent resistance to thermal shock, thermal fatigue and oxidation by utilizing such flaky β-SiC.

Fundamentally speaking, the organic silicon polymers employable in the present invention have the following unit structures:

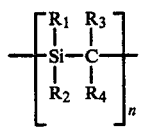
(I)

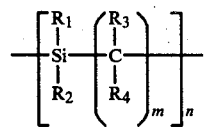
(II)

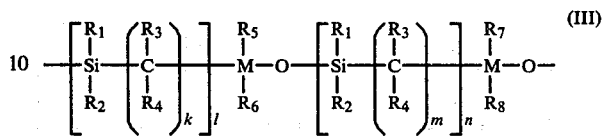
(III)

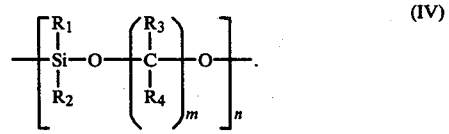
(IV)

wherein $R_1$ is —$CH_3$; and $R_2$, $R_3$ and $R_4$ are one or more members selected from the group consisting of hydrogen, alkyl, aryl, $(CH_3)_2CH$—, $(C_6H_5)_2SiH$— and $(CH_3)_3Si$—.

k, l, m and n show the numbers of repetition of the unit structures defined by ( ) and [ ], and usually vary in the following ranges: k=1–80; l=15–350; m=1–80; n=15–350. The average molecular weight of the organic silicon polymers is in the range of 800–20000.

In unit structure III, M is a metallic or nonmetallic element such as Si, B, Ti, Fe, Al, Zr, Cr and the like, and may be contained in the starting material and/or is mixed in the starting material during the use of the catalyst employed for synthesis of the organic silicon polymer and is contained in the major skeletals. $R_5$, $R_6$, $R_7$ and $R_8$ are one or more members selected from the group consisting of hydrogen, alkyl, aryl, $(CH_3)_2CH$—, $(C_6H_5)_2SiH$— and $(CH_3)_3Si$—, but any one or more of $R_5$, $R_6$, $R_7$ and $R_8$ may be absent, depending on the valence of M and the unit structure.

(v) Compounds that contain any one or more of unit structures (i)–(iv) as partial unit structures in their chain or three-dimentional construction; or the mixture of such compounds.

The average molecular weight of the organic silicon polymer compounds employed as the starting material of the present invention is in the range of 800–20000 and advantageously in the range of 1000–5000 and has a slightly larger range than the polymers for spinning. It is preferable to remove preliminarily organic silicon polymers having an average molecular weight above 20000 because of difficulty in fusion and sheet manufacture. It is also advisable to remove as much as possible organic silicon polymers having an average molecular weight below 800 and contaminating compounds having a low boiling point, because the presence of such compounds may cause some troubles in anti-fusion treatment, flaking and sintering, namely perforation, sticking and irregular thickness of the final products respectively.

The average molecular weight of the organic silicon polymer according to the present invention (M=ΣMiNi/ΣNi) is determined in tetrahydrofuran at 20° C. by osmometry using a vapor pressure osmometer.

The fusion and softening point of these polycarbosilicon compounds varies depending on the distribution curve of the molecular weights and usually is in the range of 100° C. to 350° C. When the organic silicon polymers in block, gel or powder state are heated directly in the atmosphere of a non-oxidative gas, they change to the liquid of low viscosity at a temperature of 100° C. to 350° C.

The organic silicon polymers molded into plate and thin membrane-like sheets silicon polymers is also easily liquefied, deformed or gelled upon heating in the atmosphere of a non-oxidative gas at a temperature of 100° C. to 350° C., giving rise to inseparable products. In the method according to the present invention, the organic silicon polymer molded in a thin sheet is preliminarily subjected to heat treatment at a temperature of 50° C. to 400° C. in the atmosphere of an oxidative gas such as the air, oxygen and ozone (anti-fusion treatment) so that the initial shape of the product may be maintained during the subsequent heat treatment in the atmosphere of a non-oxidative gas.

When the air is used as the oxidative gas which is relatively mild and easily controllable, the temperature is slowly raised to 70° C. during a period of more than 20 minutes, and preferably of 40–100 minutes, and the anti-fusion treatment is carried out at a temperature of 70° to 400° C., and preferably of 120° to 240° C., for a period of 30 minutes to 5 hours, and preferably of 1 hour to 3 hours. This anti-fusion treatment gives a uniformly thick and least wavy sheet, which assures no troubles such as shrinking, deformation, irregular thickness and perforation of the final product in the subsequent heat treatment.

It should be remembered, however, that a thickness of a sheet above 100$\mu$ before anti-fusion treatment often leads to irregular thickness or wavy surface on the subsequent heat treatment. Thus the upper limit of thickness of a sheet should be 100$\mu$. In addition, when a sheet is less than 10$\mu$ thick before anti-fusion treatment, the handling thereof becomes extremely difficult and the occurrence of laceration and perforation during the anti-fusion treatment is clearly confirmed under a microscope.

Therefore the present inventors have defined the average thickness of the thin sheet for production of flaky materials to between 10$\mu$ to 100$\mu$.

Before describing the heat treatment of an infusible sheet specifically, it seems useful to explain some general scientific observations on the change of the organic silicon polymer sheet which is provided with the anti-fusion treatment. When an infusible organic silicon polymer sheet is heated to a high temperature above its melting point in the atmosphere of a non-oxidative gas such as $N_2$, $H_2$, $NH_3$, Ar and CO gas, $R_1$–$R_8$ in the aforementioned unit structures of the organic silicon polymer compounds (a hydrogen atom, alkyl, aryl, $(CH_3)_2CH—$, $(C_6H_5)SiH—$ and $(CH_3)_3Si—$) begin to escape as volatile breakdown products around 300° C., while the skeletal carbon and silicon components become amorphous, and the formation of $\beta$-SiC starts at a temperature around 800° C.

At this stage, several to several hundreds molecules of $\beta$-SiC are formed without regular crystal lattice from the amorphous material mainly composed of Si and C. In other words, several to several hundreds molecules of $\beta$-SiC are present in the dispersed state in the carbon-rich amorphous material mainly composed of Si and C.

As the temperature rises above 1000° C. and subsequently above 1200° C., the production of $\beta$-SiC from the amorphous phase rapidly increases and consequently the percentage of the amorphous phase decreases, while the carbon excess advances in the amorphous phase.

The amorphous phase of the Si-C system obtained after heat treatment to a temperature below 1000° C. is still labile and unfavorable for subsequent processing. As the formation of $\beta$-SiC is relatively abundant and the activity of the amorphous phase diminishes at a temperature above 1200° C., it is possible to handle the sheet as the stable flaky material even in the presence of oxygen.

Upon heating to a temperature above 1500° C. in the atmosphere of a non-oxidative gas, mainly $\beta$-SiC and carbon are produced.

The thermal treatment at a temperature above 1800° C. is not satisfying, because the flaky material becomes fragile and loses mechanical strength.

Based on these observations, the present inventors have determined the range of the heating temperature for synthesis of the flaky products between 1200° C. to 1800° C.

The above describes the fundamental findings on the production of flaky $\beta$-SiC from the organic silicon polymer and its preparation method.

In the following, several processes are presented for preparation of $\beta$-SiC.

By methods detailed in the embodiments described later or other methods, a thin organic silicon polymer sheet having the thickness of 10$\mu$ to 100$\mu$ is prepared and is subsequently made infusible by known processes such as ozone treatment, heating in the air, $\gamma$-ray irradiation or organic peroxide treatment. The obtained infusible sheet of the organic silicon polymer can be cut at this stage into small flaky pieces, each flaky piece having the length and the breadth 10-100 times greater than the thickness thereof, since the sheet has a sufficient mechanical strength to be handled without trouble. Then the thin sheet or the flaky pieces made of the infusible organic silicon polymer is heated in the atmosphere of a non-oxidative gas such as $N_2$, $H_2$, $NH_3$, CO and Ar at a temperature of 1200°–1800° C. whereby a tenacious and elastic sheet or flaky piece mainly composed of $\beta$-SiC is produced. The $\beta$-SiC sheet is cut into flaky pieces having a regular or irregular shape depending on the applications or purpose of the use, and each piece has the length and the breadth 10-100 times greater than its thickness. As described above, flaking may be effected either before or after the heat treatment in the atmosphere of a non-oxidative gas.

According to the methods described above, flaky $\beta$-SiC can be produced from the organic silicon polymer. The details of such methods are described in Example 1 and Example 2.

Subsequently, the properties of the microstructure of ceramics produced with flaky $\beta$-SiC of the present invention will be explained.

First of all, the technique of the present invention to produce ceramics, and more particularly ceramics of laminar construction with $\beta$-SiC is completely novel and has never been described in the literature.

Therefore, it will be useful to explain some special backgrounds of the ceramic industry which has clamored for the advent of such new technique with the new material from the viewpoint of thermal load. Thereafter, applications and features of ceramics according to the present invention are described.

The environments of thermal load applied on ceramics of the present invention are classified into four categories.

(A) When heat is suddenly supplied on one surface of a ceramic plate or on one inner or outer surface of a ceramic tube, the thermal stress exceeds the rupture strength of the ceramic, resulting in fracture. In this case, the source of fracture is located on the heated surface, because a fracture occurs in the restricted area neighboring the heated surface where the sudden thermal expansion of the heated surface is suppressed in vain.

(B) When heat is supplied from one surface of a ceramic plate or from one inner or outer surface of a ceramic tube, the thermal stress occurs by temperature gradient due to compression and tension. In this case, a fracture occurs on the unheated surface or the tension surface which has been known to be a weak point of ceramics.

(C) When a large ceramic plate or a long tube is exposed to heating, a concentric and radial fracture is observed.

(D) When a small temperature change is repeatedly produced locally on one surface of a ceramic plate or on one inner or outer surface of a ceramic tube, minute cracks develop by accumulation of thermal energy in the hysteresis loop even if the change is under the elastic limit, finally resulting in a fracture due to thermal fatigue.

As explained above, the environments of thermal load leading to the fracture of ceramics by thermal stresses are summarized as follows: (A) sudden and vigorous temperature change; (B) distortion by temperature gradient; (C) local heating; (D) thermal fatigue; and these load factors synergistically interact with each other in a complicated manner.

Under these circumstances, traditional ceramics have no physical strength sufficient enough to restrict their own expansion and are condemned not to be able to utilize plastic deformation like metals at a low temperature. Metals can effect enough plastic deformation by dislocation thereof, so that they may escape from fracture. Thus it has been one of the important tasks in ceramics to expand the breaking limits due to thermal stresses by using some structural control.

For promoting the dispersion of stresses, grains (grain boundaries), short fibers and long fibers have successfully been utilized in composite materials such as rubbers (FRR), plastics (FRP), metals (FRM) and concretes (FRC). In the ceramic industry, however, the application of thin sheets or flaky materials (or flakes) for dispersion of thermal stress has never been reported and thus might be one of the fruitful future approaches.

Flaky graphite is a sole hitherto known example of such flaky or fish-seal-like materials wherein the thermal stresses are dispersed by providing anisotropy to the structure of heat-resistant ceramics. However, graphite has a restricted range of applications, because it is least resistant to oxidation.

Although several papers are found in the literature which report that a heat-resisting woven cloth of boron fibers and alumina fibers adhered with resin is laminated as FRC, they completely differ from the present invention in applications, methodology and starting materials.

The term "laminar or stratified structure" used in the present invention is based on the fact that the resistance to thermal shock of a graphite crucible can be markedly improved by arranging flaky graphite in a concentric manner, and thus is defined as a structure where flaky material are arranged in a same direction. Such anisotropic structure permits the flaky materials and the interspaces therebetween to respond flexibly to thermal stresses.

The present inventors have succeeded in preparation of the ceramic sintered compact having improved resistance to thermal shock and thermal fatigue by forming a laminar structure made of flaky $\beta$-SiC and producing appropriate spacings and bondings in the boundary area between such flaky materials as well as between the flaky material and the matrix by means of lamination with flaky $\beta$-SiC. The laminar ceramics of flaky $\beta$-SiC according to the present invention will be applied as the new material in the following fields:

(1) High temperature structural materials of the non-oxide system:
Material: SiC, $Si_3N_4$, $SiC$-$Si_3N_4$ composite system, etc.
Application:
(a) Material for efficiency improvement and energy saving of furnaces.
Examples:
ceramic recuperator tube,
ceramic radiant tube,
ceramic duct for high temperature drafting,
high-efficiency ceramic burner, etc.
(b) Material for sophisticated ceramic parts
Examples:
ceramic turbine blade,
ceramic engine,
ceramic nose cone
(c) Material for other uses
Examples:
high temperature anti-friction material,
ceramic high-temperature coating, etc.
(2) Improvement of traditional ceramics containing graphite as the major or subsidiary material.
Material: all refractory materials
Application: refractory articles and crucibles
(a) Nozzles for pouring molten metals
Examples:
continuous casting nozzle,
immersion nozzle,
long nozzle,
new ladle nozzle,
plates and nozzles for sliding-nozzle-type flow regulating device,
stopper head,
long stopper, etc.
(b) Other refractory articles
Examples:
refractory inner lining for a blast furnace,
trough material for a blast furnace,
oxygen lance,
thermal shock-resistant furnace part,
graphite crucible, etc.

The shapes of ceramic articles listed above are mostly of hollow tube and are used under rigorous conditions of thermal load such as inner heating with outer cooling and vice versa.

In the high-temperature structural materials of the non-oxide system (application 1), ceramics may open a new field of research by substituting heat-resisting alloys. As is apparent in the attached examples, the laminar articles of flaky $\beta$-SiC according to the present invention have shown markedly improved resistance to thermal shock and thermal fatigue in comparison with commercially available non-oxide sintered compacts.

On lamination of stratification of flaky β-SiC, molding and synthesis (firing) were carried out well considering following factors;
(a) the orientation and flexibility (flexural strength) of the flaky materials,
(b) the absorption of expansion of the flaky materials,
(c) the relation between the mechanical strength and the bonding strength of the flaky materials, and
(d) the relation of the chemical bonding with the physical entanglement, so as to cope with abrupt temperature change and thermal fatigue.

The ceramics of flaky β-SiC of the present invention find their best utility in application (1) of high-temperature structural materials with high added values and express their advantages mainly in cylindrical or tubular shapes.

In application (2) of refractory articles, substitution of flaky graphite with β-SiC in traditional refractory articles containing flaky graphite led to the surprising improvement of resistance to oxidation and thermal shock. In some cases of substitution of graphite, flaky β-SiC did not show a laminar structure, but was oriented in random directions. Even under such random orientation, flaky β-SiC, as flaky materials, retains to a certain extent a lamination-like structure disposing between coarse particles thus buffering thermal stresses. In addition, flaky β-SiC per se can disperse thermal stresses. Compared with flaky graphite, flaky β-SiC has a higher strength, a greater chemical reactivity and a larger friction in its surface, all of which contribute to strengthen resistance to thermal shock. In addition, flaky β-SiC has a far better resistance to oxidation than flaky graphite. When used in refractories, β-SiC on the surface or in the superfacial layer of articles is oxidized to $SiO_2$, resulting in the volume expansion. It also reacts with other refractory components to form an anti-oxidation layer which prevents the drastic inward oxidation of the refractory articles.

By controlling the grain size of refractory components and the molding method, flaky materials in the refractory composition can be oriented in a laminar direction or in random directions.

Table 1 summarizes the orientation and the content of flaky graphite in commercially available refractory graphite articles together with molding methods.

Embodiments 6 and 7 disclose refractory articles with improved resistance to oxidation and thermal shock which are manufactured by substituting a partial or the total amount of flaky graphite in the refractory articles listed in Table 1 with flaky β-SiC of the present invention.

Embodiment 8 discloses a refractory brick with new features which is obtained by admixing flaky β-SiC of of the present invention. Some graphite articles in which β-SiC can not replace flaky graphite; for example, basic refractory inner linings which are used for refining molten metals at a high temperature above 1600° C. in the presence of basic slug (MgO-C system, CaO-C system and MgO CaO-C system) are not included in Table 1. Excluding such exceptions, the combined use of, or the replacement with, flaky β-SiC generally results in the improvement of resistance to oxidation and thermal shock of refractory graphite articles. The amount of β-SiC varies depending on the applications but usually in the range of 1 percent to 60 percent by weight.

Hereinafter, the method of the present invention for producing flaky β-SiC, their applications and their advantages will be discussed in view of following embodiments, but such embodiments are solely for explanation purpose and should not be construed to limit the scope of the invention in any way.

Embodiment 1

Method for preparation of flaky β-SiC (1) 100 g of an organic silicon polymer that was solid at room temperature; had an average molecular weight of 1800; and was composed of unit structures (I) as the main skeletal component and of unit structure (II) as the minor skeletal component; was dissolved in 80 cc of n-hexane.

(2) The organic silicon polymer solution from (1) was poured on the surface of mercury in a stainless steel vessel (2000 mm long × 500 mm broad × 100 mm deep) and the n-hexane was evaporated off at room temperature to provide a thin sheet of the organic silicon polymer with a means thickness of 50μ.

(3) The mercury was gently removed from the vessel, leaving the thin sheet of the organic silicon polymer.

(4) The sheet of the organic silicon polymer in the vessel was slowly heated to 100° C. in the stream of oxygen gas at a rate of 50° C./hour and made infusible by exposing for three hours at the same temperature.

TABLE 1

| Classification of graphite depending on the orientation | Application or name (example) of refractories | Graphite content (weight percentage) | Molding method |
| --- | --- | --- | --- |
| Refractory articles in which flaky materials form seemingly laminar or stratified structure | stopper head | 10–30 | auger machine; uni-directional molding (repress) |
| | graphite crucible | 20–60 | auto-spinning method; uni-directional molding |
| | graphite lance | 10–60 | vacuum extrusion molding |
| | graphite nozzle | 15–35 | vacuum extrusion molding |
| | sliding nozzle plate | 1–15 | uni-directional molding |
| | graphite brick for a blast furnace | 20–65 | uni-directional molding |
| Refractory articles in which flaky materials or a group of flaky materials show random orientation | graphite nozzle | 15–40 | isostatic press molding |
| | graphite material for a trough | 10–30 | flow molding or vibration molding |
| | graphite crucible | 20–90 | isostatic press molding |

The infusible sheet had a mechanical strength sufficient enough to endure the subsequent processing without trouble.

(5) The infusible sheet of the organic silicon polymer was cut into 1.5 mm squares by a cutter to provide flaky materials.

(6) The flaky materials of the infusbile organic silicon polymer was placed in a high-purity carbon container; heated in the argon gas stream at a rate of 50° C./hour; kept at 1300° C. for 5 hours and then cooled to room temperature.

(7) Small elastic pieces with black luster were obtained and these pieces were confirmed as $\beta$-SiC by X-ray diffraction analysis.

(8) A long sample strip which has been taken at the above infusion treatment was similarly fired at the same firing condition. This $\beta$-SiC strip or sheet showed a tensile strength of 220 kg/mm$^2$.

Vacuum extrusion molding is one of the convenient methods to produce a mold of laminar stratified structure from the flaky materials.

The present inventors prepared the flaky materials from 6 mm to 1 mm long and wide $\beta$-SiC strips with a mean thickness of 38$\mu$ (12$\mu$ to 80$\mu$ thick). The extrusion molding was disentangled in n-hexane with care not to break the flaky materials and thereafter the flaky materials were collected. The particle size determination indicated that the particle size distribution shifted to a lower side during above mixing and extrusion molding, the largest size being 3 mm.

As it is unfavorable to break the flaky materials in an extrusion molding machine, the present inventors determined the size (width and length) of the flaky materials in the range of 10–100 times greater than the thickness thereof. In other words, the above is a preferable and practical size range of the flaky materials according to the present invention.

Embodiment 2

Method for preparation of flaky $\beta$-SiC (1) 100 g of an organic silicon polymer that was solid at room temperature; has an average molecular weight of 2100; and contained unit structure (I) as the major skeletal component and unit structures (II) and (III) as minor skeletal components was dissolved in 100 cc of tetrahydrofuran.

(2) A sheet of woven cloth made of acryl fibers with a mean diameter of 80$\mu$ was soaked in the solution obtained from (1) and then taken out.

(3) After more than 70% of the tetrahydrofuran was evaporated off into the air at room temperature, the impregnated cloth was rolled in a high-purity carbon roller.

(4) The remaining tetrahydrofuran was completely removed by heating the cloth at 65° C. for 2 hours in the nitrogen gas stream.

(5) The cloth on the roller, the texture of which was covered with the thin film of the organic silicon polymer was slowly heated to 200° C. in the air and maintained at the same temperature for 5 hours to provide the cloth covered with the infusible organic silicon polymer.

(6) The roller from step (5) was placed in a high-purity carbon container; slowly was heated in the argon gas stream at a rate of 50° C./hour to reach 1200° C.; kept for 5 hours at the same temperature; and then cooled to a room temperature.

(7) The elastic sheet with dull black luster was de-rolled from the carbon roller and was ground under kneading in a rubber bag until small flakes having a size similar to the mesh of the texture of the cloth were obtained. The flakes had a mean thickness of about 50$\mu$ and average length and breadth of 0.8 mm respectively.

(8) X-ray diffraction analysis proved that the small flakes were made of $\beta$-SiC.

Embodiment 3

Process for producing a thermal-shock resistant tube of laminar or stratified structure which is mainly composed of flaky $\beta$-SiC.

(1) The starting materials employed in this embodiment consisted of 70 parts by weight of flaky $\beta$-SiC prepared according to the present invention; 15 parts by weight of metallic silicon powder with a particle size of less than 44$\mu$ which was made lipophilic by surface treatment; 15 parts by weight of the organic silicon polymer in soft jelly state which was prepared by dissolving the organic silicon polymer in tetrahydrofuran and then removing the tetrahydrofuran by evaporation; and 3 to 7 parts by weight of a petrochemical solvent useful as a plasticity regulator.

(2) Primarily, the organic silicon polymer (15 parts by weight) and the silicon powder (15 parts by weight) were mixed in a kneader. Flaky $\beta$-SiC was added to the mixture and was several times subjected to a mixer of the soil kneader type. During these operation, the plasticity and operability were adjusted by addition of the petrochemical solvent in an amount of 3% to 7%.

(3) The treated mixture was molded into two types of tubes with a vacuum extrusion molding machine, the tubes having external diameter of 150 mm, length of 1000 mm, and thickness of 5 mm and 50 mm respectively.

(4) The tubes were placed in a hanging-type container, were carried to a drying furnace or oven, where low-boiling materials were removed, and then were made infusible by heating in the air at 200° C. for 5 hours. At this stage of treatment, a bending strength of 150 kg/cm$^2$ was recorded.

(5) The infusible tubes were heated in the stream of nitrogen gas containing ammonia (N$_2$:NH$_3$=1000:1 by volume ratio) at a heating rate of 30° C./hour in a nitriding oven of the muffle type and fired at 1350° C. for 24 hours and further at 1450° C. for 10 hours.

(6) The theoretical mineral composition of the stratified sintered body of flaky $\beta$-SiC produced by the above process agreed well with the result of X-ray analysis, showing 78% of ($\alpha+\beta$) SiC and 22% of ($\alpha+\beta$) Si$_3$N$_4$.

A part of each fired body was cut out for physicochemical determinations. The results are shown in Table 2.

TABLE 2

| item | Stratified-structure tube of the present invention | (a) | (b) | (c) | (d) | (e) |
|---|---|---|---|---|---|---|
| Bulk density | 2.65 | — | — | — | — | — |
| Open porosity % | 13.2 | 21.3 | 18.2 | 12.3 | 1.7 | 3.2 |
| Bending strength (kg/mm$^2$) room temperature | 43.2 (19.1) | 19.8 | 12.2 | 15.6 | 49.9 | 37.3 |

TABLE 2-continued

| item | Stratified-structure tube of the present invention | (a) | (b) | (c) | (d) | (e) |
|---|---|---|---|---|---|---|
| 1400° C. | 39.5 (20.8) | 20.1 | 13.1 | 14.3 | 27.6 | 21.1 |

The article of the present invention in Table 2 showed directionality for the bending strength. The values with no parenthesis are the measurement when the article was bent at a right angle to the orientation of the flaky materials, whereas the values in the parenthesis indicates the strength on bending parallel to the orientation of the flaky materials.

For comparison purposes, the following conventional articles are included in Table 2, (a) reaction-sintered $Si_3N_4$; (b) reaction-sintered SiC; (c) SiC with bound reaction-sintered $Si_3N_4$; (d) hot pressed $Si_3N_4$ with addition of MgO; (e) hot pressed SiC with addition of $B_2O_3$.

It is apparent from Table 2 that the article of the present invention exhibited clear directionality in terms of the bending strength depending on the orientation of the flaky materials. It was also proved that the flaky materials had a relatively high strength.

Embodiment 4

Comparison of various cylindrical sintered bodies for resistance to thermal shock Resistance to repeated heating on the inner surface was determined with respect to following cylindrical bodies, namely the cylindrical sintered body of the present invention having laminar or stratified structure which was produced in Experiment 3; (a) the cylindrical sintered bodies of the same size prepared with conventional reaction-sintered $Si_3N_4$; (b) cylindrical sintered bodies of the same size prepared with conventional reaction-sintered SiC; and (c) cylindrical sintered bodies of the same size prepared by the conventional SiC with bound reaction-sintered $Si_3N_4$.

An oxygen-propane burner was disposed at one side of the cylindrical sintered body and the flame of the burner was adjusted such that the temperature of the flame passing through the cylindrical sintered body reached a maximum at the center of the cylindrical sintered body. The maximum temperature was measured to be 1480°–1530° C. with an optical pyrometer.

After the flame was passed through the tubular body for 5 minutes, the burner was removed from the test cylindrical body by turning, then cylindrical body was cooled for 5 minutes. The heating and cooling were repeated until the crack occurred. Table 3 represents the number of repetitions of the heating and cooling before occurrence of cracks.

TABLE 3

| item | Article of the present invention having laminar or stratified-structure | a | b | c |
|---|---|---|---|---|
| Number of repetitions of the heating and cooling before | >1000 | 85~98 | 82~105 | 73~121 |

TABLE 3-continued

| item | Article of the present invention having laminar or stratified-structure | a | b | c |
|---|---|---|---|---|
| occurrence of cracks | | | | |

The conventional sintered bodies caused cracks after the heating and cooling were repeated 70–120 times, whereas the article of the present invention having laminar or stratified structure easily endured 1000 repetitions of the above treatment. Repetition test more than 1000 time was not conducted since the value (1000 times) is sufficient for a comparison purpose.

Embodiment 5

Comparison for resistance to thermal fatigue

The sintered body of the present invention described in Embodiment 3 and the conventional sintered bodies (a), (b), (c), (d), and (e) employed in Embodiment 3 were subjected to the breaking test with respect to resistance to thermal fatigue under the subsequent conditions. A $5 \times 5 \times 50$ mm sample plate was cut out from each sintered body and 1% of the bending strength was applied as the initial load through a head (radius 1 mm) located at the center of a span of 30 mm.

The sample plate was pulsated with the total deflection of $10\mu$, while the head was forced to follow the displacement with certainty. Such test conditions were reproduced at 1300° C. in an oven and the pulsation rate was 30 cycles/second. The results in Table 4 show the number of pulsations until the rupture of the sample plate occurred or the great deformation which the head could not follow.

TABLE 4

| Article | Number of pulsations until occurrence of rupture (cycles) | Remarks |
|---|---|---|
| Article of the present invention having laminar or stratified-structure | | |
| perpendicular to the orientation of flaky materials | more than $5 \times 10^7$ | no rupture occurred |
| parallel to the orientation of flaky materials | $7 \times 10^5$ | rupture occurred |
| a | $2 \sim 4 \times 10^4$ | " |
| b | $6 \sim 8 \times 10^5$ | " |
| c | $2 \sim 5 \times 10^5$ | " |
| d | — | incomparable because of great deformation |
| e | — | incomparable because of great deformation |

When the load was applied at a right angle to the orientation of flaky materials, the sintered body of the present invention having laminar or stratified structure endured more than $5 \times 10^7$ cycles without rupture. In contrast, when the application of the load was parallel with the orientation of the flaky materials, it ruptured at $7\times 10^5$ cycles. This drastic difference clearly proves marked anisotropy of the flaky materials of the present invention.

Embodiment 6

Improvement of refractory graphite articles

The physico-chemical properties of four molten-metal-pouring nozzles were comparatively examined. Nozzle (A) was a commercially available alumina-graphite nozzle. Nozzle (B) was manufactured by a conventional method except that a half of the quantity of the graphite in nozzle (A) was replaced by flaky $\beta$-SiC of the present invention. Nozzle (C) was a zirconia-graphite nozzle. Nozzle (D) was produced by replacing the total amount of the graphite in nozzle (C) with flaky $\beta$-SiC of the present invention.

Table 5 summarizes the general physical properties, the results of oxidation test and spalling test and the erosion index of the errosion test.

higher resistance to oxidation. Article (D) of the present invention was proved to be 35 times more resistant to oxidation than conventional article (C).

In the spalling test, the inner surface of the test cylindrical body (inner diameter 100 mm; outer diameter 160 mm; length 850 mm) was heated for 5 minutes with a large-capacity burner (300,000 Kcal/hour) using LPG and $O_2$ as fuel and medium; cooled for 5 minutes with water; and then cooled for 5 minutes with the air. Under repetition of this cycle, the number of repetitions before occurrence of cracks was examined. Articles (B) and (D) of the present invention showed 2-fold and 3.5-fold higher resistances to thermal shock than conventional articles (A) and (C), respectively, in terms of the number of cycles before occurrence of cracks.

The erosion test was performed as follows. A molten metal and a slug poured into a mold on continuous casting were melt at 1600° C. in high-frequency heated graphite crucible. Four bar-shaped sample pieces

TABLE 5

| Article | A (conventional article) | B (article of the present invention) | C (conventional article) | D (article of the present invention) |
|---|---|---|---|---|
| Major materials | $Al_2O_3$—C | $Al_2O_3$—C—flaky $\beta$-SiC | $ZrO_2$—C | $ZrO_2$—flaky $\beta$-SiC |
| Graphite content | 30 parts by weight | 15 parts by weight | 20 parts by weight | — |
| Substituted by flaky -SiC | — | 15 parts by weight | — | 20 parts by weight |
| (General physical properties) | | | | |
| bulk density | 2.33 | 2.50 | 3.30 | 3.49 |
| apparent porosity (%) | 18.5 | 16.8 | 17.0 | 16.5 |
| bending strength (kg/cm²) | | | | |
| room temperature | 85 | 168 | 92 | 255 |
| 1400° C. | 88 | 173 | 60 | 263 |
| Thickness of the oxidation layer after the oxidation test | | | | |
| 30 minutes | 3.0 | 1.0 | 3.5 | 0.3 |
| 100 minutes | 8.5 | 2.0 | 7.5 | 0.3 |
| 300 minutes | 17.0 | 3.5 | 17.5 | 0.5 |
| Spalling resistance (number of cycles before occurrence of crack) | 5 | 10 | 2 | 7 |
| Erosion index | | | | |
| slug-air interface | 100 | 40 | 66 | 5 |
| metal-slug interface | 100 | 58 | 38 | 28 |

The bending strength of the articles of the present invention is far superior to that of the conventional articles at both room temperature and 1400° C. The oxidation test was carried out at 1200° C. in a cylindrical oven using C gas as fuel. After samples bricks were kept in the oven for 30, 100 and 300 minutes, the thickness of the oxidation layer was measured. Article (B) of the present invention gave about one fifth of the oxidation rate of conventional article (A). This implies 5-fold (A)–(D) were simultaneously immersed in the molten metal and a holder for each sample piece was rotated for 100 minutes at a speed of 1. r.p.m. The amounts of erosion of the sample pieces at the powder-air interface and the metal-powder interface were measured subsequently. In Table 4, the degree of erosion was relatively shown by index, using the amount of erosion of sample piece (A) as 100.

The articles of the present invention exhibited marked superiority to the conventional articles, particularly at the slug-air interface. Even at the metal-slug interface, superiority of flaky β-SiC to graphite was proved by improved resistance to erosion.

Embodiment 7

Graphite stopper head and a graphite crucible

By replacing with flaky β-SiC of the present invention a half amount of the graphite in a graphite stopper head and in a graphite crucible containing a binder of the clay system or the carbon-rich residual resin system (pitch, resin, etc.), the stopper head and the crucible of the present invention were manufactured by conventional methods. Table 6 shows the results of comparison test of resistances to oxidation and thermal shock.

In the oxidation test, the test articles were placed in a tubular gas oven, and subjected to a temperature of 1400° C. for 30 minutes and 100 minutes and thereafter the thickness of the oxidation layer was observed respectively.

In the spalling test, the above articles were kept at 1500° C. for 30 minutes in the above-described oven and then rapidly cooled under forced aeration. The state of crack formation was recorded.

The articles of the present invention using flaky β-SiC gave more than 2-fold higher bending strengths than the conventional ones.

The articles of the present invention showed more than 3-fold better resistance to oxidation and 3 to 4-fold higher resistance to thermal shock than the traditional articles.

Embodiment 8

Refractory plates for a sliding nozzle

When 1-20% flaky graphite is added to a commercially available carbon-bonded refractory plate, the sliding surface thereof becomes smooth and resistant to thermal shock. However the addition of graphite also reduces erosion resistance and accelerates the enlargement of the diameter of the pouring opening due to the erosion. Thus the excellent properties of graphite have not successfully been utilized. The present inventors have now succeeded in developing a refractory plate for the purpose having a prolonged lifetime and the improved properties by adding 1% to 20% of flaky β-SiC to an $Al_2O_3$-C refractory plate (carbon-bonded type).

Table 7 summarizes the results of physico-chemical determination, oxidation test and thermal shock test and the results of use in actual pouring operation with respect to a conventional refractory plate as well as the refractory plates of the present invention, all of which were molded with a uni-directional press and fired under usual conditions.

TABLE 6

| Application | Stopper head | | Graphite crucible | |
|---|---|---|---|---|
| Article number | E | F (article of present invention) | G | H (article of present invention) |
| Graphite content (%) | 20 | 10 | 40 | 25 |
| Amount of β-Sic | — | 10 | — | 15 |
| Molding method | | auger drawing method mold cutting and grinding method uni-directional repressing method | | automatic spinning lathe method |
| Physical properties of the fired body | | | | |
| bulk density | 2.05 | 2.10 | 1.80 | 1.86 |
| apparent porosity (%) | 19.0 | 18.8 | 24.5 | 23.8 |
| bending strength (kg/cm$^2$) | 70 | 145 | 80 | 156 |
| Thickness of the oxidation layer after the oxidation test (m/m) | | | | |
| 1400° C. × 30 min. | 3.0 | 1.0 | 4.5 | 1.0 |
| 1400° C. × 100 min. | 3.5 | 1.0 | 7.0 | 2.0 |
| Spalling resistance, number of cycles before occurrence of cracks | 2 | 8 | 2 | 6 |

TABLE 7

| Article | Conventional refractory plate | Refractory plate of the present invention | | | | | |
|---|---|---|---|---|---|---|---|
| | — | I | J | K | L | M | N |
| Amount of flaky β-SiC (%) | — | 0.5 | 1 | 3 | 5 | 10 | 20 |
| Major materials | alumina, mullite, carbon | alumina, mullite, carbon, flaky β-SiC | | | | | |
| Molding method | uni-directional molding with a large press | uni-directional molding with a large press | | | | | |
| Physical properties of the fired refractory plate | | | | | | | |
| bulk density | 2.80 | 2.80 | 2.81 | 2.83 | 2.80 | 2.78 | 2.75 |
| apparent porosity (%) | 11.5 | 11.3 | 11.5 | 11.0 | 11.0 | 12.2 | 4.5 |
| bending | 90 | 88 | 125 | 178 | 264 | 358 | 420 |

TABLE 7-continued

| Article | Conventional refractory plate | Refractory plate of the present invention | | | | |
|---|---|---|---|---|---|---|
| | — | I | J | K | L | M | N |
| strength (kg/cm²) at 1400° C. Thickness of the oxidation layer (m/m) | | | | | | | |
| 1400° C. × 30 min | 3 | 2.5 | 2 | 1.5 | 1 | 1 | 1 |
| 1400° C. × 100 min | 8 | 6.5 | 4 | 3 | 2.0 | 1.5 | 1 |
| Results of the burner spalling test | small cracks | small cracks | minute cracks | no cracking | no cracking | no cracking | no cracking |
| Results of use in actual pouring operation | | | | | | | |
| erosion | ○ | — | — | ◎ | ◎ | ◎ | — |
| cracking | ○ | — | — | ◎ | ◎ | ◎ | — |

○ indicates - ordinary
◎ indicates - better
— indicates - not tested

In the oxidation test, the oxidation layer was measured after a 40 mm cube of the sintered body was heated at 1400° C. for 30 and 100 minutes in an electric oven which has a silicon carbide heater.

The thermal shock test was carried out by passing the flame of an oxygen-propane burner through the hole of the test plate with the rear opening thereof lightly covered so that the highest temperature zone of the flame was located at the center of the hole. After above rapid heating, the test plate was rapidly cooled.

The maximum temperature of the flame in the hole was measured to be 1480°-1530° C. with an optical pyrometer. After passing the flame for 5 minutes, the burner was removed from the test plate and the test plate was cooled for 5 minutes. The result of the burner spalling test shown in Table 7 was the result obtained after one cycle of heating and cooling.

Test plate (I) did not differ from the conventional one in terms of resistance to both oxidation and thermal shock. The addition effect of flaky β-SiC began at 1.0% (J) and reached a maximum at 3-5% (K and L). With addition of 20% of flaky β-SiC, in spite of the continued increase in bending strength, the test plate (N) became porous. In addition, although not shown in Table 7, erosion resistance to molten metals seemed to be reduced.

Based on the results of use in actual pouring operation on test plates (K), (L) and (M), particularly the results with respect to smoothness of the sliding face, enlargement of the hole and resistance to thermal shock, the present inventors have concluded that the addition of flaky β-SiC in the range of 1-15% results in marked prolongation of the life of a refractory plate.

What we claim is:

1. A method of preparation of flaky β-SiC which comprises the following steps:
   (a) forming a sheet of an average thickness of 10-100μ from an organic silicon polymer containing the carbon and silicon atoms as the major skeletal components, said polymer being selected from at least one of the following unit structures (I)—(IV):

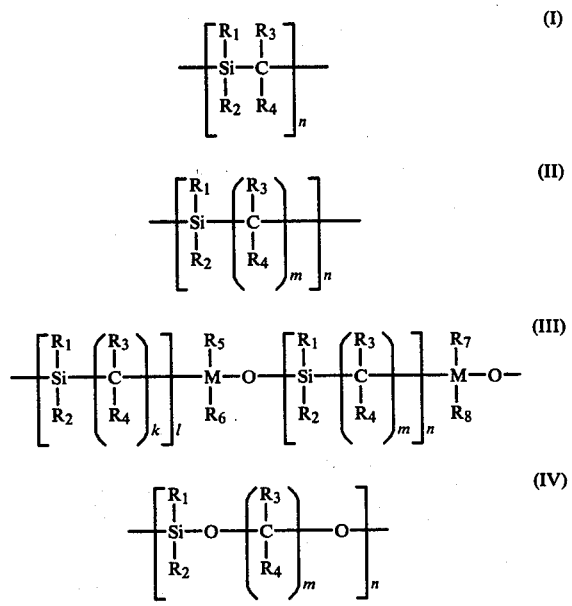

wherein $R_1$ is —$CH_3$ and $R_2$, $R_3$ and $R_4$ are one or more members selected from the group consisting of hydrogen, alkyl, aryl, $(CH_3)_2CH$—, $(C_6H_5)_2SiH$ and $(CH_3)_3Si$—;

k, l, m and n are the respective numbers of repetition of the unit structures defined by the immediately preceding parentheses or brackets and k=1-80, l=15-350, m=1-80, and n=15-350, the average molecular weight of the polymer being in the range of 800-20000;

M is a metallic or nonmetallic element which is Si, B, Ti, Fe, Al, Zr or Cr; and $R_5$, $R_6$, $R_7$ and $R_8$ are one or more members selected from the group consisting of hydrogen, alkyl, aryl, $(CH_3)_2CH$—, $(C_6H_5)_2SiH$— and $(CH_3)_3Si$— and any one or more of $R_5$, $R_6$, $R_7$ and R₈ may be absent depending on the valence of M and the unit structure, (b) making said sheet infusible by conventional methods to give an infusible sheet, (c) cutting said infusible sheet in a regular or irregular size to provide infusible flaky materials having a width and length of 100 μ to 10 mm, and (d) heating said flaky materials in an atmosphere of a non-oxidative gas at a temperature of 1200°–1800° C. to give flaky β-SiC.

2. A method for preparation of flaky β-SiC which comprises the following steps:

(a) forming a sheet of an average thickness of 10–100μ from an organic silicon polymer containing the carbon and silicon atoms as the major skeletal components, said polymer being selected from at least one of the following unit structures (I)–(IV):

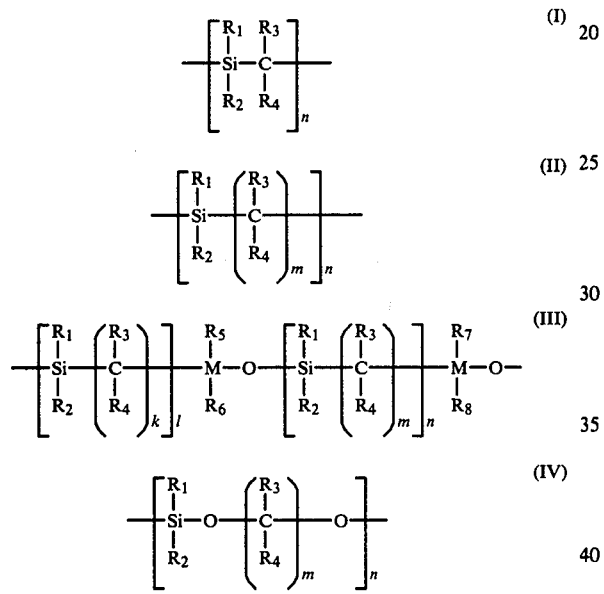

wherein
R₁ is —CH₃, and R₂, R₃ and R₄ are one or more members selected from the group consisting of hydrogen, alkyl, aryl, (CH₃)₂CH—, (C₆H₅)₂SiH— and (CH₃)₃Si—:

k, l, m and n are the respective numbers of repetition of the unit structures defined by the immediately preceding parentheses or brackets and k=1–80, l=15–350, m=1–80, and n=15–350, the average molecular weight of the polymer being in the range of 800–20000;

M is a metallic or nonmetallic element which is Si, B, Ti, Fe, Al, Zr or Cr; and R₅, R₆, R₇ and R₈ are one or more members selected from the group consisting of hydrogen, alkyl, aryl, (CH₃)₂CH—, (C₆H₅)₂SiH— and (CH₃)₃Si, and any one or more of R₅, R₆, R₇ and R₈ may be absent depending on the valence of M and the unit structure, (b) making said sheet infusible by conventional methods to give an infusible sheet, (c) heating said infusible sheet obtained from said step (b) in an atmosphere of a non-oxidative gas at a temperature of 1200°–1800° C. to give a β-SiC sheet, and (d) cutting said heat-treated β-SiC sheet obtained from step (c) in a regular or irregular size to provide flaky materials having a width and length of 100μ to 10 mm.

3. In a method of making a ceramic material having improved properties of resistance to thermal shock, thermal fatigue and oxidation, excluding MgO refractories and CaO refractories, the improvement wherein the method comprises a step of introducing into the ceramic material to be molded, flaky β-SiC having a thickness of 10–100μ and a width and length of 100μ to 10 mm, and orienting said flaky β-SiC in a laminar direction in the ceramic material, said flaky β-SiC being prepared by the steps of:

(a) forming a sheet of an average thickness of 10–100μ from an organic silicon polymer containing the carbon and silicon atoms as the major skeletal components, said polymer being selected from at least one of the following unit structures (I)–(IV):

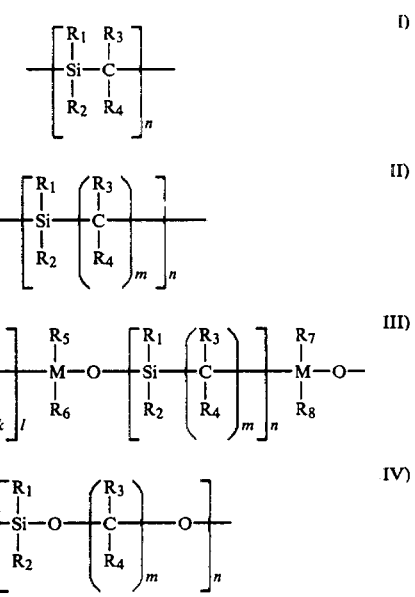

wherein
R₁ is —CH₃ and R₂, R₃ and R₄ are one or more members selected from the group consisting of hydrogen, alkyl, aryl, (CH₃)₂CH—, (C₆H₅)₂SiH and (CH₃)₃Si—;

k, l, m and n are the respective numbers of repetition of the unit structures defined by the immediately preceding parentheses or brackets and k=1–80, l=15–350, m=1–80, and n=15–350, the average molecular weight of the polymer being in the range of 800–20000;

M is a metallic or nonmetallic element which is Si, B, Ti, Fe, Al, Zr or Cr; and R₅, R₆, R₇ and R₈ are one or more members selected from the group consisting of hydrogen, alkyl, aryl, (CH₃)₂CH—, (C₆H₅)₂SiH— and (CH₃)₃Si— and any one or more of R₅, R₆, R₇ and R₈ may be absent depending on the valence of M and the unit structure, (b) making said sheet infusible by conventional methods to provide an infusible sheet, (c) heating said polymer in an atmosphere of a non-oxidative gas at a temperature of 1200°–1800° C., and (d) cutting said sheet either before or after said heating step to provide flaky material having said width and length of 100μ to 10 mm.

* * * * *